Dec. 30, 1941.    O. A. WINDSOR    2,268,090
PORTABLE JUNCTION BOX
Filed May 14, 1941
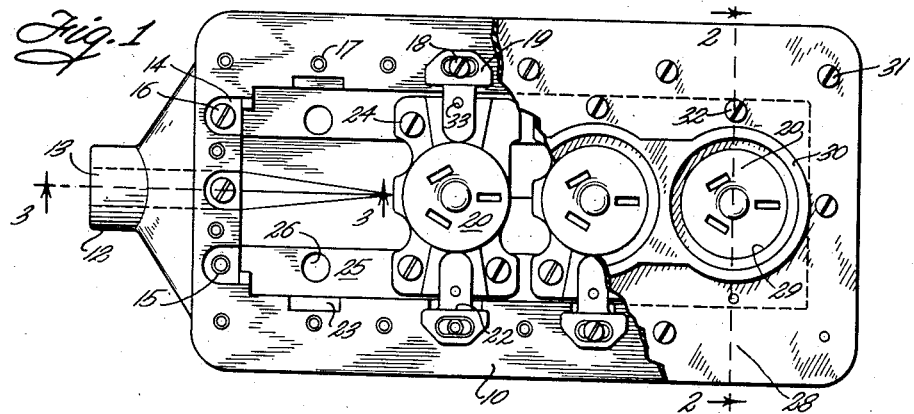
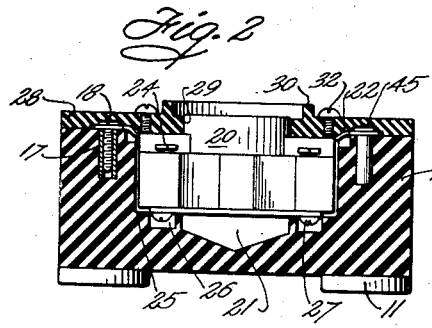
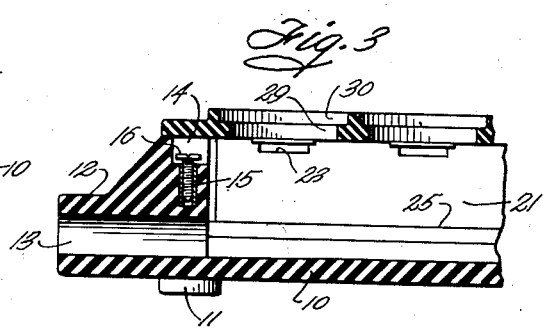
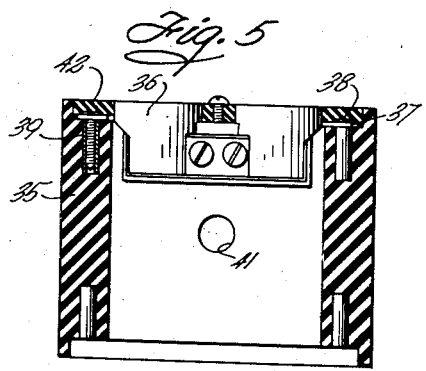
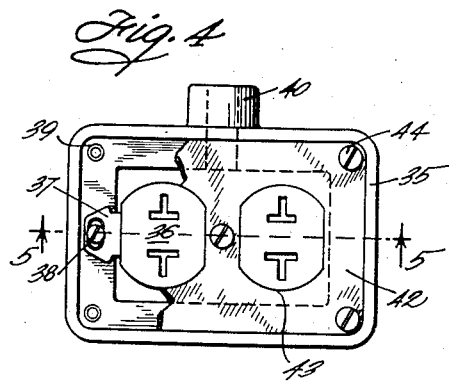
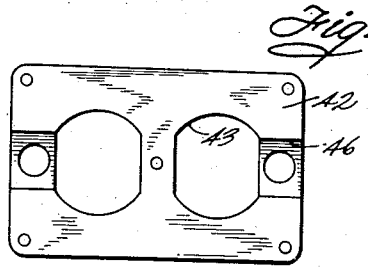
Inventor
OTIS A. WINDSOR
By Hazard and Miller
Attorneys Patented Dec. 30, 1941

2,268,090

UNITED STATES PATENT OFFICE 2,268,090

PORTABLE JUNCTION BOX

Otis A. Windsor, Santa Monica, Calif.

Application May 14, 1941, Serial No. 393,346

4 Claims. (Cl. 173—334)

This invention relates to a portable junction box for use in electric circuits.

An object of the invention is to provide a portable junction box which is formed of flexible rubber and which is designed to receive and have mounted therein one or more sockets which are electrically connected to lead-in conductors or supply lines whereby the junction box can be readily transported or suitably located and tools that are electrically driven plugged into the sockets of the junction box. In many industries, such as for example the airplane industries, it is highly desirable to have a portable junction box which can be conveniently transported and located near where work is being performed by a number of electrically operated tools. Such junction box should not only be capable of resisting damage but also be so designed as to avoid damaging the work if accidentally dropped thereon. The improved junction box is designed to satisfy all of the these requirements.

Another object of the invention is to provide a portable junction box designed to receive and have mounted therein conventional forms of sockets and to so recess the box and shape its construction as to accommodate protuberances and fittings on the conventional sockets and to effectively protect the same.

With the foregoing and other objects in view, which will be made manifest in the following detailed description and specifically pointed out in the appended claims, reference is had to the accompanying drawing for an illustrative embodiment of the invention, wherein:

Figure 1 is a top plan view of the improved portable junction box, a portion of the cover of the box being illustrated as having been broken away and one of the sockets being illustrated as having been removed;

Fig. 2 is a vertical section taken substantially upon the line 2—2 upon Fig. 1 in the direction indicated;

Fig. 3 is a longitudinal vertical section through the body of the box taken substantially upon the line 3—3 upon Fig. 1;

Fig. 4 is a view in side elevation of an alternative or modified form of junction box embodying my invention, a portion of the cover being illustrated as having been broken away;

Fig. 5 is a section view taken substantially upon the line 5—5 upon Fig. 4; and

Fig. 6 is a view in elevation illustrating the interior of the cover used on the modification illustrated in Fig. 5.

Referring to the accompanying drawing wherein similar reference characters designate similar parts throughout and referring specifically to the embodiment of the invention illustrated in Figs. 1 to 3, the improved portable junction box comprises a box-like body 10 formed of resilient rubber or like yieldable insulating material. On the bottom of this box there may be formed integral therewith disc-like legs or pads 11 which serve to support the box on any surface on which it may be positioned. At one end of the box there is formed a protruding external nipple 12 in which is formed a passage 13 adapted to receive lead-in conductors or wires supplying electric current to the box. On the interior of the end wall of the box on which the nipple 12 is located there are formed recesses 14 which extend downwardly from the top edge of the end wall and in the bottoms of these recesses there are embedded nuts 15 designed to receive screws 16 serving as binding posts on the interior of the box for the lead-in conductors. In the form illustrated, the sockets and the box are designed for use with a three-phase alternating current supply, and to this end there is illustrated three recesses 14 within each of which there is the screw 16 to serve as the binding post.

In the top edges of the side walls of the box there are embedded nuts 17 designed to receive attaching screws 18 for fastening the wings or flanges 19 of sockets, generally designated at 20, in place in the box. The distance between the side walls of the box is such that these wings or flanges rest upon the top edges of the side walls with the body portions of the sockets disposed in the large longitudinal hollow center 21 of the box.

As the wings or flanges of the conventional socket usually have small shoulders or bends 22 adjacent their point of connection to the socket, the inner edges of the side walls are recessed as at 23 to accommodate these shoulders or bends and to permit the wings or flanges to rest flatly on the top edges of the side walls. The conventional sockets are equipped with suitable binding posts 24 which are electrically connected by wires or conductors to the binding post 16. These wires or conductors as well as the lead-in wire conductors are not illustrated on the drawing.

The box illustrated is shown as being of such a length as to accommodate four sockets, but it will be obvious that the number of sockets accommodated by the box may vary. At the bases of the side walls there are formed shoulders 25 on which the bottoms of the sockets rest, and these shoulders are recessed as at 26 to accommodate the screw heads 27 that are present on the bottom of the conventional socket.

A cover is provided which is likewise formed of soft, resilient rubber, such cover being indicated at 28. It has openings 29 formed therethrough which serve to expose the faces of the sockets or receptacles 20. Surrounding these openings there are upstanding resilient flanges 30 which serve to protect the faces of the sockets or receptacles in the event that the junction box is accidentally stepped upon or dropped on its cover. The cover is fastened in place by means of screws 31 which extend into some of the nuts 17 that are not utilized by the attaching screws 18. In addition thereto there are screws 32 passing through the cover and into holes 33 on the wings 19.

By means of the above-described construction it will be appreciated that each socket or receptacle is firmly held within the portable junction box and that each socket or receptacle is effectively insulated from its neighbor. The binding posts 24 of all sockets are connected to the binding posts 16.

In the modification illustrated in Figs. 4 to 6, inclusive, the body of the box 35 is tubular in form and preferably formed of soft, resilient rubber. The body has open sides within which are mounted the sockets or receptacles 36, these being attached by their laterally extending wings 37 by means of screws 38 extending into nuts 39 which are embedded in the edges of the side walls of the box. The top of the body of the box is provided with an outwardly extending nipple 40 having an opening 41 therethrough designed to receive the lead-in conductors which may, if desired, be suspended. The lead-in conductors are connected to the binding posts of the sockets or receptacles mounted in opposite sides of the junction box.

A cover is provided for each side of the junction box such cover being indicated at 42 and has openings 43 formed therein exposing the faces of the sockets or receptacles 36. The cover is fastened in place such as by screws 44 which extend into nuts 39 at the corners of the box. In this form of construction the entire junction box may be suspended by the lead-in conductors and the plugs of various tools that are to be electrically connected thereto applied to the sockets or receptacles through the openings in the covers.

The under or interior surfaces of the covers 28 and 42 are recessed as indicated at 45 and 46, respectively, to accommodate the attaching wings and the heads of the screws or bolts passed therethrough so that the covers, when fastened in place, will rest firmly against the wall edges of the body.

From the above-described constructions it will be appreciated that the improved junction box is neat, simple, and durable in appearance and is readily portable. In the event that the junction box is accidentally dropped the resiliency of the body of the box effectively prevents its damaging the work. The sockets are firmly mounted in the box regardless of its being resilient, and in the event that the box should be stepped on or dropped accidentally on its cover, the projecting flanges 30 effectively prevent damage to the sockets or receptacles.

Various changes may be made in the details of construction without departing from the spirit or scope of the invention as defined by the appended claims.

I claim:

1. A portable junction box comprising a boxlike body formed of resilient rubber, there being an opening in one wall thereof for lead-in conductors, binding posts on the interior of the body adjacent said openings to which said conductors are adapted to be connected, one or more sockets mounted within the body adapted to be electrically connected to the binding posts, the side walls of the body being recessed to receive portions of the mounting means of the sockets and having nuts embedded therein to receive attaching screws for the sockets and for the cover.

2. A portable junction box comprising a boxlike body formed of resilient rubber, there being an opening in one wall of the box for lead-in conductors, nuts embedded in the side walls of the body adjacent the top edges thereof, one or more sockets disposed within the body having screws extending through attaching portions thereof into the nuts, and a cover attached to the body having openings therein exposing the sockets.

3. A portable junction box comprising a boxlike body formed of resilient rubber, there being an opening in one wall of the box for lead-in conductors, nuts embedded in the side walls of the body adjacent the top edges thereof, one or more sockets disposed within the body having screws extending through attaching portions thereof into the nuts, there being shoulders formed on the body adjacent the bases of the side walls engageable by the bottoms of the sockets, recesses in said shoulders to accommodate portions of the sockets, recesses at the inner edges of the side walls to accommodate portions of the attaching means of the sockets, and a cover for the box having recesses accommodating the attaching portions of the sockets, and having openings therethrough exposing the faces of the sockets.

4. A portable junction box comprising a boxlike body formed of resilient rubber, there being an opening in one wall of the box for lead-in conductors, nuts embedded in the side walls of the body adjacent the top edges thereof, one or more sockets disposed within the body having screws extending through attaching portions thereof into the nuts, there being shoulders formed on the body adjacent the bases of the side walls engageable by the bottoms of the sockets, recesses in said shoulders to accommodate portions of the sockets, recesses at the inner edges of the side walls to accommodate portions of the attaching means of the sockets, and a cover for the box having recesses accommodating the attaching portions of the sockets and having openings therethrough exposing the faces of the sockets, said cover having upstanding resilient flanges surrounding the openings.

OTIS A. WINDSOR.